United States Patent [19]
Kendall

[11] Patent Number: 4,844,673
[45] Date of Patent: Jul. 4, 1989

[54] LOCK SPINDLE BLIND BOLT WITH LOCK COLLAR PROVIDING PIN STOP SUPPORT

[75] Inventor: James W. Kendall, Huntington Beach, Calif.

[73] Assignee: Huck Manufacturing Company, Irvine, Calif.

[21] Appl. No.: 393,488

[22] Filed: Jun. 29, 1982

[51] Int. Cl.⁴ .............................................. F16B 13/04
[52] U.S. Cl. ....................................... 411/34; 411/43; 411/70
[58] Field of Search ........................ 411/34, 38, 43, 70, 411/354, 501, 35, 36, 37; 29/522 R, 522 A

[56] References Cited
U.S. PATENT DOCUMENTS

| 877,118 | 1/1908 | Peirce. |
|---|---|---|
| 2,061,628 | 11/1936 | Huck. |
| 2,371,452 | 3/1945 | Lees, Jr.. |
| 2,397,111 | 3/1946 | Huck. |
| 2,466,811 | 4/1949 | Huck. |
| 2,526,235 | 10/1950 | Huck. |
| 2,538,623 | 1/1951 | Keating. |
| 2,887,003 | 5/1959 | Brilmyer. |
| 2,991,681 | 7/1961 | Brilmyer. |
| 3,047,181 | 7/1962 | Heidenwolf. |
| 3,073,205 | 1/1963 | Siebol. |
| 3,078,002 | 2/1963 | Rodgers, Jr.. |
| 3,107,572 | 10/1963 | Orloff. |
| 3,148,578 | 9/1964 | Gapp. |
| 3,192,821 | 7/1965 | Siebol. |
| 3,203,300 | 8/1965 | Marschner. |
| 3,215,024 | 11/1965 | Brilmyer et al.. |
| 3,232,162 | 2/1966 | Ketchum. |
| 3,253,495 | 5/1966 | Orloff. |
| 3,276,308 | 10/1966 | Bergere. |
| 3,277,771 | 10/1966 | Reynolds. |
| 3,285,121 | 11/1966 | Siebol. |
| 3,292,482 | 12/1966 | Fry et al.. |
| 3,301,122 | 1/1967 | Wagner. |
| 3,377,907 | 4/1968 | Hurd. |
| 3,377,908 | 4/1968 | Stau et al.. |
| 3,390,601 | 7/1968 | Summerlin. |
| 3,426,375 | 2/1969 | Jeal. |
| 3,461,771 | 8/1969 | Briles. |
| 3,657,957 | 4/1972 | Siebol. |
| 3,698,278 | 10/1972 | Trembley. |
| 3,880,042 | 4/1975 | Binns. |
| 3,915,055 | 10/1975 | Binns. |
| 3,937,123 | 2/1976 | Matuschek et al.. |
| 4,012,984 | 3/1977 | Matuschek. |
| 4,112,811 | 9/1978 | King. |
| 4,127,345 | 11/1978 | Angelosanto et al.. |
| 4,143,580 | 3/1979 | Luhm. |
| 4,230,017 | 10/1980 | Angelosanto. |
| 4,288,016 | 11/1966 | Reynolds. |

FOREIGN PATENT DOCUMENTS

| 1906989 | 2/1973 | Fed. Rep. of Germany. |
|---|---|---|
| 517709 | 8/1976 | U.S.S.R.. |
| 1413592 | 11/1975 | United Kingdom. |
| 1478934 | 7/1977 | United Kingdom. |

Primary Examiner—Neill R. Wilson
Attorney, Agent, or Firm—Harness, Dickey & Pierce

[57] ABSTRACT

A blind bolt for securing workpieces including a sleeve, pin and lock collar, and generally being of the non-sleeve-expanding type (i.e., non-hole-filling), and adapted to have said sleeve in clearance in openings, said pin adapted to form a bulbed head on the sleeve shank, a pin stop defined by engageable shoulders on pin and said sleeve, a lock pocket defined by a conical bore portion in said sleeve and an annular lock groove in said pin when positioned in alignment by said pin stop, said conical bore portion terminating in an axially straight counterbore, an annular lock ring located within said counterbore and adapted to be engaged by a single action tool, said tool having means for gripping the pin and an anvil for engaging said lock ring and for applying a relative axial force between said pin and said sleeve via lock ring, said lock ring being urged against said conical bore portion, the angle of said conical bore portion selected to permit movement of said lock ring into said lock pocket at a preselected load while maintaining the frictional force against the pin (prior to engagement) below a preselected magnitude whereby said lock ring will move into said lock pocket to cooperate with said pin stop to prevent axial movement of said pin resulting from radial expansion of said sleeve.

13 Claims, 4 Drawing Sheets

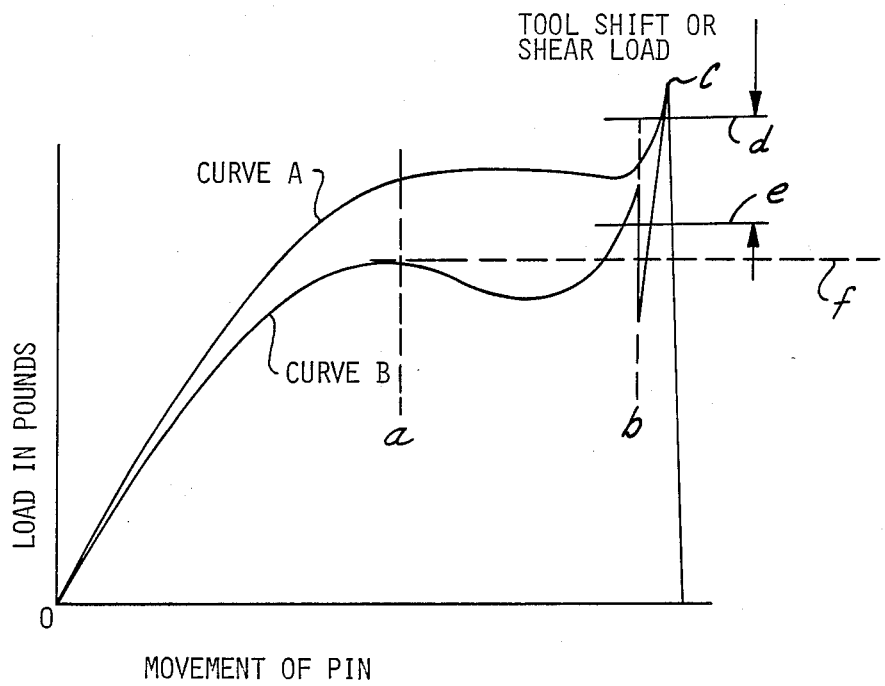
*Fig-2*
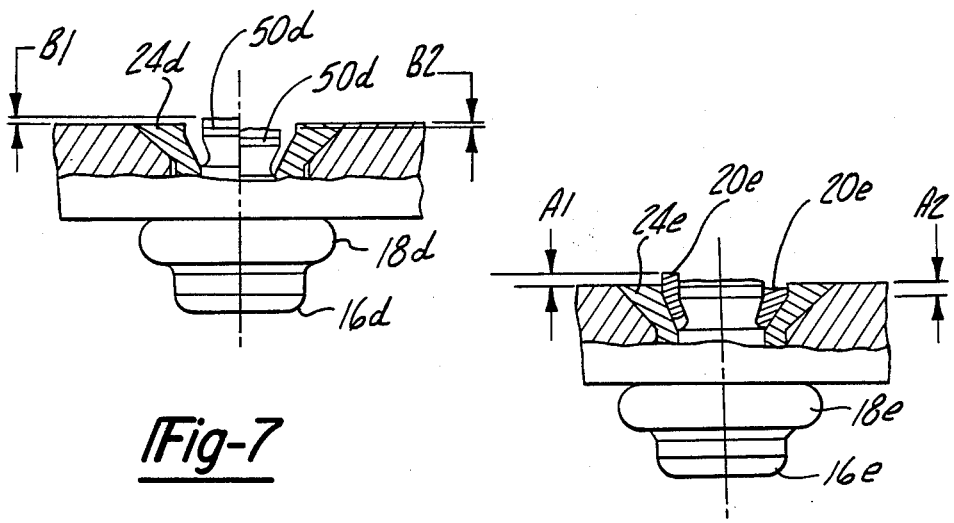
*Fig-7*  *Fig-8*

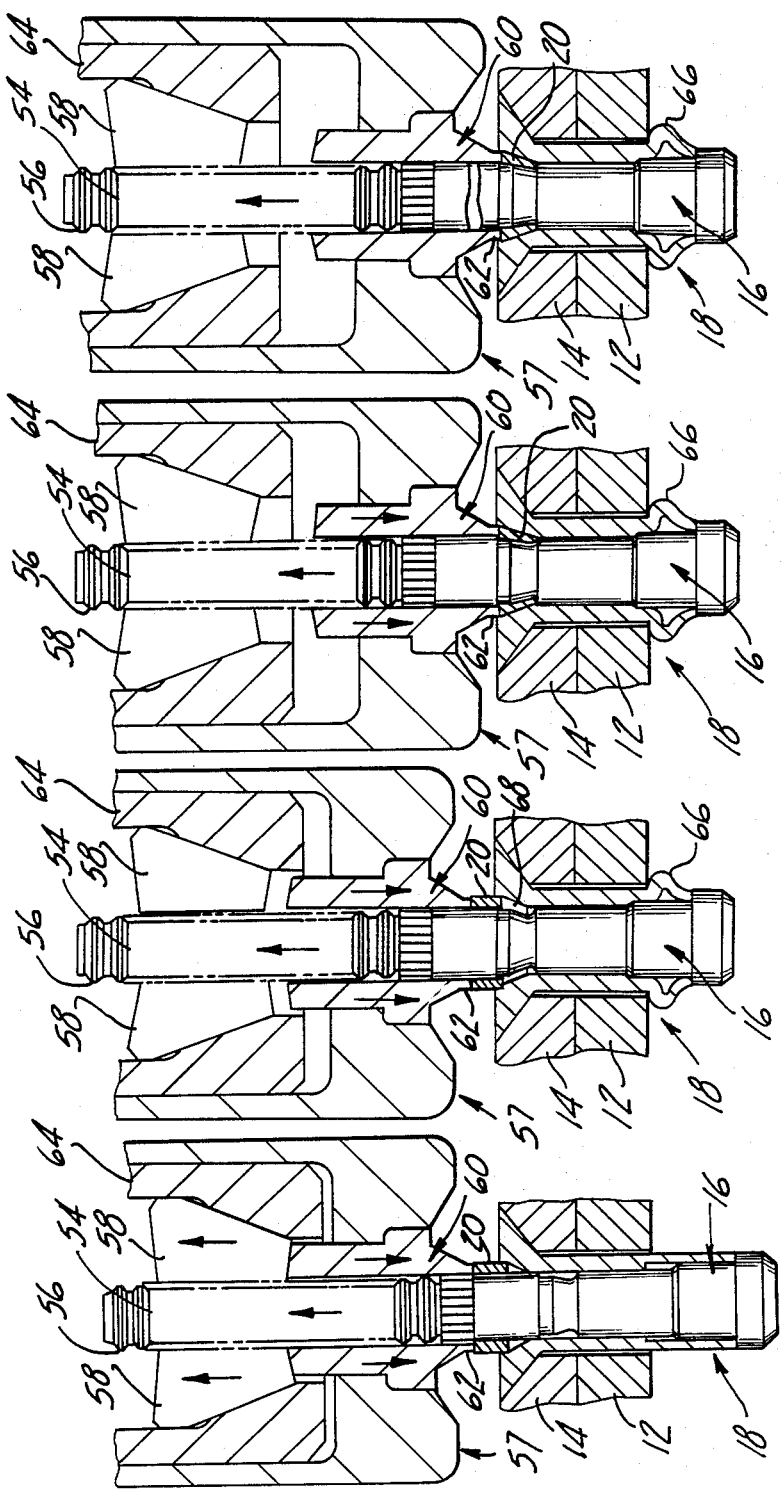

LOCK SPINDLE BLIND BOLT WITH LOCK COLLAR PROVIDING PIN STOP SUPPORT

SUMMARY-BACKGROUND OF THE INVENTION

The present invention relates to lock spindle blind bolts and more particularly to a lock spindle blind bolt including a sleeve and a pin and having a lock collar inhibiting radial sleeve expansion by supporting the pin stop.

Blind bolts of the type of the present invention are designed for use in structural applications (in contrast to many blind rivets which are conventionally for non-structural uses). In addition, the blind bolt of the present invention is non-sleeve expanding or hole filling (which is also generally in contrast to conventional blind rivets). In aircraft applications, blind bolts are conventionally at or near maximum hardness in order to provide maximum strength. Hence the blind bolt of the present invention preferably is of the type shown and described in U.S. Pat. No. 3,253,495 issued to J. F. Orloff on May 31, 1966 and entitled "Hardened Blind Bolt With Annealed Shank Portion." Hence, the present blind bolt comprises a sleeve, a pin and a lock collar which function generally as shown and described in the subject Orloff patent. While the Orloff patent taught a unique construction for providing a gradient of hardness in the sleeve to enhance bulb formation, the present invention is directed to providing an improved pin stop and lock construction for locking the pin and sleeve together after the blind head has been formed. In this regard the lock is provided by a lock ring which is moved into a lock pocket defined by confronting cavities on the pin and the sleeve after a first mechanical stop between the pin and the sleeve is engaged. As the first mechanical stop is reached, the lock construction of the present invention becomes operative to supplement the stopping action to more positively assure that the travel of the pin is arrested.

As noted, blind bolts of the type of the present invention are non-sleeve expanding. In other words, such blind bolts do not perform a function of filling the mating holes in workpieces to be joined through sleeve expansion. In fact, the subject blind bolts are designed to be located in holes with a fit varying from a slight interference to a preselected clearance. With such blind bolts, the pin is stopped by engagement of stop shoulders on the pin and sleeve (shoulders 38 and 48 of Orloff, supra). As noted, the lock pocket is properly defined when the stop shoulders are engaged. In a clearance application, however, unless the lock is actuated to be set at the load when the pin and sleeve are appropriately aligned to properly define the lock cavity, the pin shoulder stop can radially expand the sleeve whereby it can override the sleeve shoulder stop. This could place the pin and sleeve lock cavities out of the desired alignment resulting in improper placement of the lock. Indeed, even if the lock is structurally satisfactory, the location of the pin a predetermined point beyond the sleeve could be aerodynamically unsatisfactory requiring either removal of the blind bolt or an auxiliary machining operation. These problems have been attended to with past constructions by carefully controlling tolerances of the lock and of the lock setting mechanism. In addition, while clearance applications are utilized, the amount of clearance is closely controlled such that the degree of radial expansion (until the hole inner walls are reached by sleeve expansion) is limited such that the stop shoulders can still adequately stop the pin. These problems have been greatly reduced with the present invention. In understanding the present invention, consideration of prior blind bolt lock constructions would be helpful.

Thus, prior blind bolt lock constructions have included the following:

1. Annular lock ring with double action tool;
2. Shear flange with lock collar of corrugated construction, and
3. Shear cap.

In the first construction (double action tool), the setting of the lock is dependent upon a shift mechanism of a tool. In the second construction, the ultimate shear load of the shear flange will determine the setting load of the lock collar portion; the shear cap operates in a similar manner. All of the above will be described in greater detail below. With the present construction, all of the loads are taken directly on the lock collar with resultant frictional loading against the pin; as will be seen, this mode of loading is controlled to provide an assist to the mechanical stop between the pin and sleeve, whereby the likelihood of this stop being violated and the lock pocket being misaligned is minimized.

Therefore, it is an object of the present invention to provide a new blind bolt construction having a new and improved lock construction. It is a second object of the present invention to provide a new blind bolt construction.

It is advantageous to provide the blind bolt with a sleeve of substantially maximum hardness and/or strength. In this regard, the general sleeve construction in the Orloff patent, supra, could be advantageously used and, hence, the disclosure of that patent is incorporated by reference. Related subject matter regarding sleeve expanding and hence hold filling blind rivets can be found in U.S. Pat. No. 4,127,345 issued Nov. 28, 1978 to Angelosanto and Kendall (the present inventor), U.S. Pat. No. 4,230,017 issued Oct. 28, 1980 to Angelosanto, and U.S. Pat. application Ser. No. 175,723, filed Aug. 6, 1980 to Angelosanto and Kendall (the present inventor). All of the above can be considered as prior art relative to the subject invention.

BRIEF DESCRIPTION OF THE DRAWINGS

FIG. 2 is a graphical representation of the load (in pounds) as applied to the pin and sleeve relative to movement of the pin for the blind bolt of the present invention and for prior art blind bolts;

FIGS. 3A through 3D are sequence drawings showing the installation of the blind bolt of FIG. 1 from the application of the tool to the blind bolt in FIG. 3A to the final setting thereof in FIG. 3D;

FIG. 7 is a fragmentary side split elevational view of a set fastener with some portions shown in section and others broken away illustrating tolerance limits on pin position; and FIG. 8 is a fragmentary side elevational view of a set fastener with some portions shown in section and others broken away illustrating tolerance limits on lock position.

DESCRIPTION OF PREFERRED EMBODIMENTS

Figure 1:
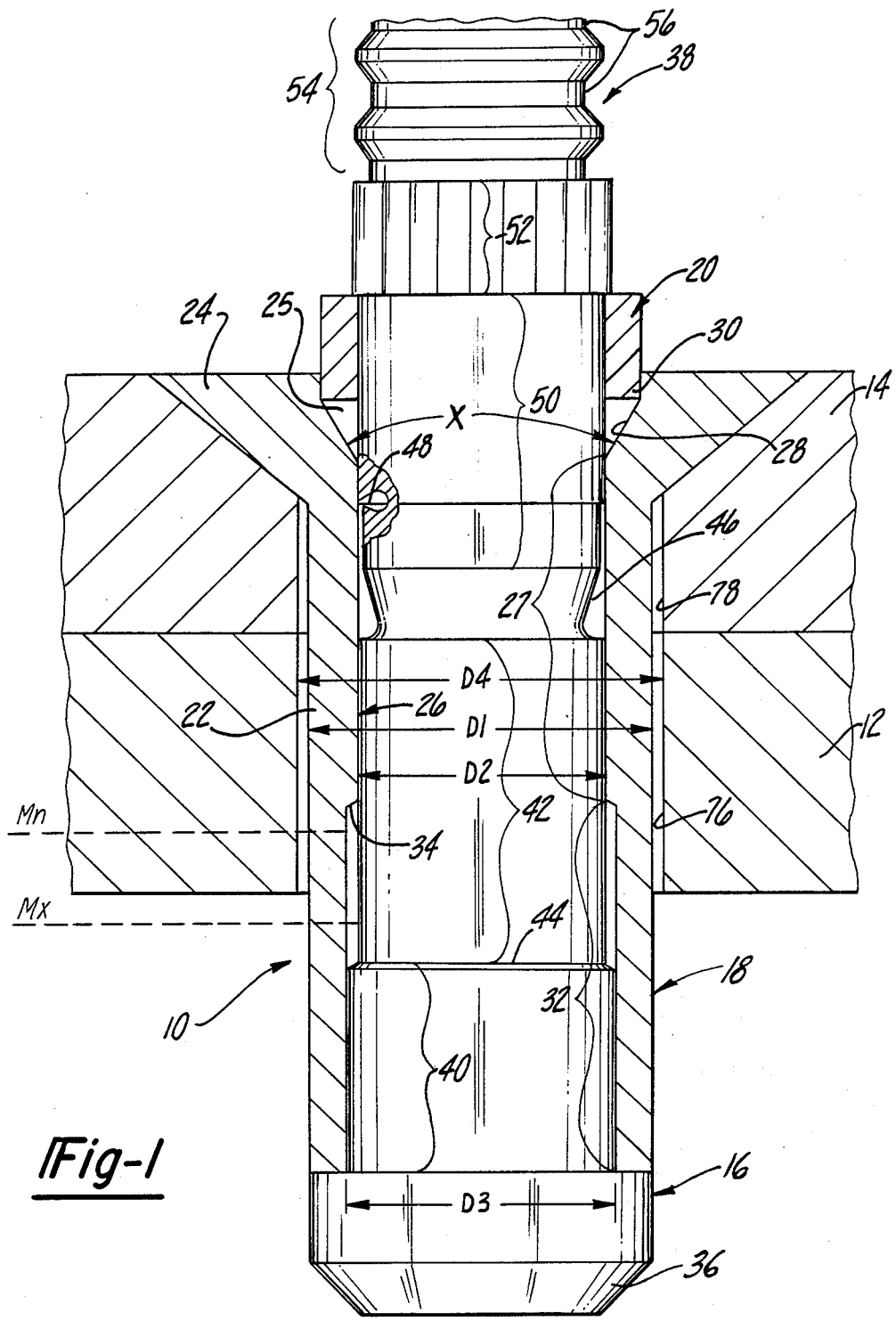
FIG. 1 is an elevational view of a blind bolt with some parts shown in section and others broken away, the blind bolt being shown prior to installation, and embodying features of the present invention.

Looking now to FIG. 1, a blind bolt assembly 10 is shown in conjunction with a pair of workpieces 12 and 14 to be secured together. The workpiece 14 is the front (or open) workpiece and the workpiece 12 is the rear (or blind side) workpiece. The blind bolt 10 comprises a pin or mandrel 16, a tubular sleeve 18 and an annular lock ring or collar 20.

The sleeve 18 has a straight shank portion 22 terminating in an englarged countersunk type head 24. The outside diameter D1 of shank portion 22 is generally uniform along its length. The sleeve 18 has a central through bore 26 which has an intermediate bore portion 27 of a diameter D2 which terminates at the enlarged head 24 in an enlarged bore portion 25 having a conically shaped bore portion 28 and an axially straight side walled counterbore portion 30. The opposite end of through bore 26 terminates in a straight, enlarged diameter bore portion 32 of diameter D3, which at the juncture with bore portion 27 defines an annular stop shoulder 34. Note that while a countersunk head configuration is shown, the features of the present invention would be equally applicable with a sleeve having a protruding head. As can be seen, the through bore 26 of the sleeve 18 matingly receives the pin 16.

The pin 16 has an enlarged head portion 36 and an elongated shank 38. The head portion 36 overengages the blind end of sleeve 18. Adjacent to the head portion 36, the shank 38 has an enlarged diameter shank portion 40 adapted to be received within enlarged bore portion 32 with a snug fit. An intermediate shank portion 42 follows and is of a smaller diameter adapted to be snugly received within bore portion 27. A pin stop shoulder 44 is defined by the juncture of shank portions 40 and 42 and cooperates with sleeve stop shoulder 34 to terminate movement of the pin 16 during installation of the fastener 10.

An annular lock groove 46 is located adjacent intermediate shank portion 42 and is adapted to define a lock pocket with the enlarged bore portion 25. A concealed or closed annular breakneck or notch 48 is defined in an annular land 50 located adjacent the lock groove 46. Such a breakneck is disclosed in the U.S. Pat. No. 3,292,482, to Fry, and is desired so as to enable the breakneck to move smoothly through annular lock ring 20. This is in contrast to prior known open breaknecks which may interfer with movement of the pin through lock ring 20. An annular splined portion 52 is located between the breakneck land 50 and an elongated pull groove portion 54; pull groove portion 54 is comprised of a plurality of annular pull grooves 56 adapted to be gripped by an installation tool in a conventional manner.

Note that the diameter of shank portion 42 and the maximum diameter of land 50 are generally the same as the diameter D2 of intermediate bore portion 27. Similarly, the diameter of enlarged shank portion 40 is generally the same as the diameter D3 of enlarged bore portion 32. Thus it can be seen that as the pin 16 is pulled through the sleeve 18, no radial expansion of the shank 22 of the sleeve 18 will be caused and, in fact, no such expansion can occur unless the pin shoulder 44 moves past the sleeve shoulder 34 whereby the enlarged shank portion 40 can move into the intermediate bore portion 27. As will be seen, the lock construction of the present invention cooperates with the stop shoulders 34, 44 to inhibit axial movement of the pin 16 relative to the sleeve 18 whereby the pin 16 will be properly located relative to the sleeve 18 to accurately define the lock pocket.

The lock ring or collar 20 is an annular split ring shaped member adapted to be received over the splined portion 52 of the pin 16 with a slight interference fit; splined portion 52 is slightly larger in diameter than land 50 to thereby retain the lockring 20 after assembly. Upon assembly, the lockring is snugly received within the straight counterbore portion 30 of the enlarged bore portion 25. The counterbore portion 30 helps to support the lock ring 20 and inhibit its deformation radially outwardly prior to its axial movement into the lock pocket.

FIGS. 3A through 3D depict the various steps in the installation of the fastener 10. Thus FIG. 3A shows the blind bolt assembly 10 located in aligned openings 76 and 78 in workpieces 12 and 14, respectively. Diameter D1 of the shank 22 is less than diameter D4 of openings 76 and 78 (see FIG. 1) whereby a clearance relationship is defined. Fig. 3A depicts the fastener 10 at the beginning of the installation cycle and shows an installation tool 57 applied thereto. The tool 57 is a single action type tool of known construction and hence details thereof have been omitted for purposes of simplicity. Tool 57 has plurality of chuck jaws 58 having teeth which are complementary with the pull grooves 56 such that the shank 38 of the pin 16 can be gripped at the pull groove portion 54. An anvil member 60 has an elongated, annular nose portion 62 adapted to engage the annular lock ring 20. The nose portion 62 is also of a size to be able to move axially, with clearance, into counterbore 30 of enlarged bore portion 25. Upon actuation of the tool 57, a collet 64, which holds the jaws 58, is urged axially rearwardly from the front side (in the direction of the arrows) applying a relative axial force between the pin 16 and sleeve 18 via the engagement of the nose portion 62 with the lock ring 20. FIG. 3B shows that upon continuation of the relative axial force, the pin 16 is moved relative to sleeve 18 and the enlarged head 36 and applies a column load upon the shank portion 22 of the sleeve 18. The column load is continuously increased until bulbing begins whereby a blind head 66 is formed against the workpiece 12 pulling it against workpiece 14 and clamping the two together.

The enlarged diameter bore portion 32 is sized to provide a preselected thin wall thickness such that bulbing will occur along that weakened section. The bulbing or upsetting continues until the axial motion of the pin 16 is initially stopped by the engagement of pin shoulder 44 with sleeve shoulder 34. In this position the lock groove 46 is now in radial alignment with the conical bore portion 28 of enlarged bore portion 25 and together they now define a lock cavity 68 adapted to receive the lock ring 20. Note that the pin 16 has moved axially relative to the sleeve 18 without radially expanding the shank 22 of the sleeve and hence the only structure to resist further axial motion and radial expansion is operative through the engagement of the stop shoulders 34, 44.

As shown in FIG. 3C with the lock cavity 68 now defined and open to the lock ring 20, the continual relative axial force (between pin 16 and ring 20) moves the lock ring 20 into the lock cavity 68. As will be seen when the lock is thus set, the stopping action of shoulders 34 and 44 is supported whereby additional axial movement of the pin 16 is precluded.

With prior blind bolt constructions, the dimensional relationship between the diameter and radial width of shoulder 34 relative to that of shoulder 44 was critical. With the blind bolt assembly of the present invention, the stop support provided by the lock construction removes some of the criticality from that dimensional relationship.

With the pin 16 now stopped, as the relative axial force continues to increase, a load is reached at which the pin 16 breaks at the breakneck 48 severing that portion of the shank 38 from the remainder of the pin; at this point the installation of the fastener is completed.

Figure 6:
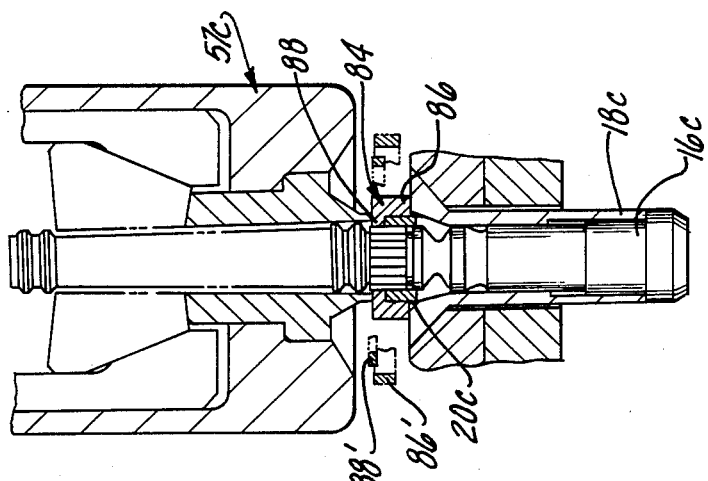
FIG. 6 is an elevational view (similar to FIG. 3A) with some parts shown in section and others broken away of a prior blind bolt construction utilizing a shear cap type lock assembly.
Figure 5:
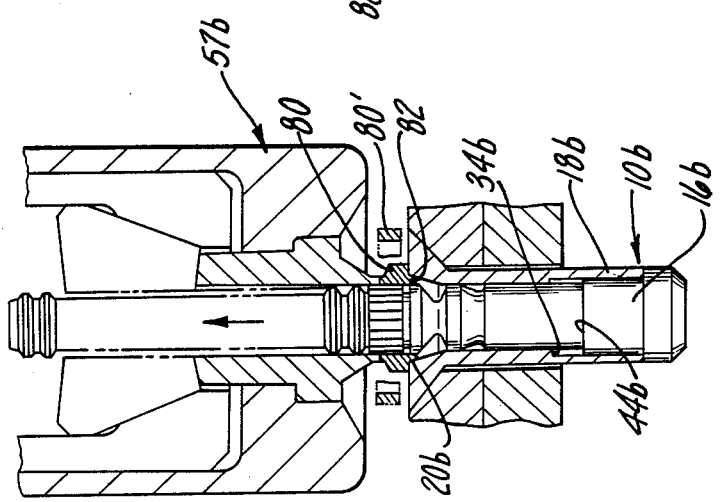
FIG. 5 is an elevational view (similar to FIG. 3A) with some parts shown in section and others broken away of a prior art blind bolt construction utilizing a shear flange type lock.

The Curve A of FIG. 2 is a graphical representation of the relative axial load in pounds, of the present invention, between the pin 16 and sleeve 18 via lock ring 20 and the movement of the pin 16. Thus, that portion of the Curve A from 'o' to 'a' represents the buildup in load and pin movement to cause partial formation of the bulbed head 66. That portion of Curve A from 'a' to 'b' represents the final formation of the bulbed head 66 and the engagement (at 'b') of the stop shoulders 34 and 44. That portion of Curve A from 'b' to 'c' represents the increase in load in setting of the lock ring 20 and the attainment of pinbreak at 'c'. To enhance reliability, it is desirable to have a significant difference in load level between 'b' and 'c' in order to avoid premature pin break which could occur due to variations in tolerances, materials, etc. This load level differential can be readily attained and maintained by the construction of the present invention. As previously discussed and as will be seen, the construction of the present invention provides a significant improvement relative to prior blind bolt constructions. Typical prior blind bolt constructions are shown in FIGS. 4 through 6.

Figure 4:
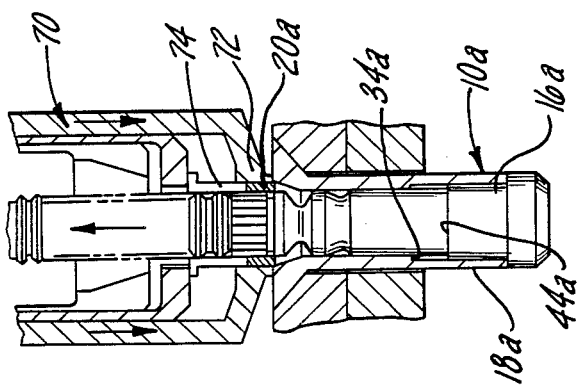
FIG. 4 is an elevational view (similar to FIG. 3A) with some parts shown in section and others broken away of a prior art blind bolt construction requiring a double action tool.

FIG. 4 depicts a prior construction to be installed with a double action tool. In the embodiment of FIG. 4, components similar to like components in the embodiment of FIGS. 1 and 3A through 3D are given the same numeral designations with the addition of the letter postscript 'a'. Thus, in FIG. 4 a double action tool 70 is shown in conjunction with a blind bolt 10a. The tool 70 can be of the type shown and described in the U.S. Pat. No. 3,792,645 to Chirco. Tool 70 has an outer anvil 72 adapted to engage the enlarge head portion of the sleeve 18a. Thus, the initial loads are taken directly by the sleeve 18a and the pin 16a. An inner anvil 74, while engageable with the lock ring 20a, exerts no force on that ring 20a until the bulb has been formed and the stop shoulders 34a and 44a have engaged. At this point the load applied by the tool 70 increases and a shift mechanism (not shown) sensing when this load attains a preselected magnitude now applies load to the inner anvil 74 and hence to the lock ring 20a to move it into its associated lock pocket. This action is also similar to that shown and described in the U.S. Pat. No. 2,466,811 to Huck where the lock ring is formed as a portion of the sleeve instead of a separate piece.

Curve B of FIG. 2 exemplifies the axial load relative to pin movement for fasteners similar to those of FIG. 4. Thus, in Curve B the point 'b' represents the load at which shifting of the tool 70 occurs to apply load to the lock ring 20a via the inner anvil 74. Since the initial load from 'o' to 'b' is solely between the sleeve 18a and pin 16a, the loads are generally lower than those over the same range for Curve A. This is because in the fastener of FIG. 1, frictional forces are present as load is at least partially applied against the pin 16 by the lock ring 20. However, because the shift mechanism of tool 70 can vary in its operation, there will be a load range over which shifting will occur; this is represented by lines 'd' and 'e'. With the tool 70 shifting to set the lock ring 20a at the high level load 'd', it is possible to encounter premature pin break because of dimensional and other variations of the breakneck. Thus pin break could occur before the lock ring 20a was set resulting in an improperly installed fastener. In addition, tool shift must be accurately maintained and could occur before bulbing is complete (for load line 'f') causing premature setting of the lock ring 20a. The possibility of these variations affecting the fastener installation has been reduced by the present construction.

The clearance fit problem previously discussed is obviated by the present construction. The blind bolt is utilized in openings in associated workpieces in a range of radial fits from a slight interference fit to a preselected clearance. Thus, the sleeve 18 of the fastener 10 in FIG. 1 is shown to be in clearance relationship with aligned openings 76 and 78 in workpieces 12 and 14. In a clearance relationship when the stop shoulders 34 and 44 are engaged, there will be a tendency for the pin 16 to radially expand the sleeve and to override the sleeve stop 34 whereby the stop could be violated. As noted, this could result in excessive pin movement throwing the lock groove 46 out of the desired radial alignment with the bore portion 25. The ultimate result could be a loss or deterioration in the formation of the lock pocket 68 and/or deterioration or loss of locking capability.

While the above noted stop violation can occur with the construction of FIG. 4, it is inhibited by the construction of FIG. 1. Thus, as the stop shoulder 34 and 44 engage, the lock pocket 68 is now open and will immediately begin to be filled by lock ring 20. This initially frictional and ultimately mechanical lock force on pin 16 will enhance the stopping action of the stop shoulders and greatly assist in assuring that this stop will not be violated.

It is conventional for blind bolts to have a tolerance relative to the workpiece openings of from 0.000" (line to line fit) to 0.003" clearance. Occasionally blind bolts are used in applications having a tolerance relative to the workpiece openings of from an interference of 0.002" interference to a clearance of 0.001". Because of the difficulty in maintaining the integrity of the pin stop, prior blind bolts were not particularly well suited for clearances in excess of the aforementioned 0.003". With the construction of the present invention clearances up to a magnitude of at least twice (0.006") of the prior acceptable clearance can be utilized. Note that the above specific tolerances typically to blind bolts of a nominal ¼" shank diameter D1 (which in practice is actually 0.260"). The above tolerances would vary as D1 varied in size.

In the past the clearance dimension has been determined in part by the radial width of the stop shoulders 34 and 44. In other words, the noted tolerance was set permitting some radial expansion at which the sidewalls of opening 76 will be engaged; when engagement occurred further radial expansion was precluded presumably leaving sufficient radial (width) surface engagement between the stop shoulders to still stop the pin. It can be appreciated that this is, at times, a delicate balance. This is especially true when the shift loads of a double acting tool, for example, could vary to the high side making even the hole engagement condition difficult to stop the pin. It should be noted that the blind bolt of the present invention and comparative prior devices are not hole filling fasteners and, hence, the type of hole engagement noted is extremely limited and not particularly desired but merely the result of an attempt to compensate for an undesirable condition.

With the present invention, the tendency for radial expansion of the sleeve 18 is inhibited by the cooperation of the lock ring 20 with the stop shoulders 34 and 44 which act together to hold the pin 16 from undesired axial movement. This permits the significant increase in clearance in which the blind bolt can be used; it also makes hole preparation less critical.

The other prior constructions of FIGS. 5 and 6 have the same disadvantages as the FIG. 4 construction. Thus, in the description of the embodiments of FIGS. 5 and 6 components similar to like components in the embodiment of FIG. 1 are given the same numerical designation with the addition of the letter postscripts 'b' and 'c' respectively.

Unlike the embodiment of FIG. 4, those of FIGS. 5 and 6 utilize single action type tools. In FIG. 5 fastener 10b utilized a lock ring 20b which is of a construction shown and described in the U. S. Pat. No. 2,887,003 to Brilmyer. Thus the ring 20b includes a shear flange portion 80 and a lock ring portion 82. Note that while a single acting tool 57b is used and the loads are applied to the sleeve 18b via the ring 20b, no frictional forces are present on the pin 16b from the ring 20b since the shear flange portion 80 supports the ring 20 b on the outer surface of the head of the sleeve 18b; this support occurs outside of the enlarged bore in the sleeve head. A slight straight counterbore portion is provided at the outer end to provide an effective shear surface. The construction is such that after stop shoulders 34b and 44b engage, the loads on the ring 20b increase until the ultimate shear stress of the shear flange is attained shearing the lock portion 82 from the shear flange portion 80 forcing the lock into the lock pocket. (See point 'b', curve B, FIG. 2.) Again because of dimensional and other variations, there will be a range or variation in shear load for the shear flange portion 80 whereby the same difficulties noted with the embodiment of FIG. 4 are present. There is also a dynamic load condition which occurs at the moment of shear which can cause undesirable pin bounce. It should be noted that the ring 20b is a relatively expensive part not only because of its configuration but also because of the need to control the magnitude of its ultimate shear load. In fact, it is a common practice to provide rings 20b of different shear characteristics in order to match pins and sleeves having dimensional and material variations. No such plurality of parts is required with the present invention. In addition, use of ring 20b results in debris in the form of the shear flange portions 80' (shown in phantom) which are broken away and split by or as a result of the shearing action.

In some applications where materials such as A286 are used, a suitable shear type lock ring such as ring 20b cannot be readily obtained. For these applications, a more complex lock assembly is utilized and shown in FIG. 6. Thus, the embodiment of FIG. 6 utilized a shear cap 84 in combination with a lock ring 20c in much the same manner as the shear type member 20b. Thus, the shear cap 84 has an outer shear ring portion 86 and an inner shear flange portion 88. Nested within the cap 84 is a lock ring 20c. The tool 57c engages the inner shear flange portion 88 and transmits axial load to the sleeve 18c via engagement of the outer ring portion 86 with the head of the sleeve 18c around the enlarged bore portion. After the bulb has been formed and the stop shoulders 34c and 44c engage, the load between pin 16c and sleeve 18c increases until the ultimate shear load of the cap 84 is exceeded (see point 'b' Curve B, FIG. 2). At this load the inner flange portion 88 is sheared from the outer ring portion 86 and the lock ring 20c is now set into the lock pocket. As can be seen, the same comments relative to the embodiment of FIG. 5 apply. Also, caps 84 of different shear characteristics are utilized to match variations in dimension and material of pins and sleeves. No such plurality of parts is required by the present invention. In addition to the difficulties of stop violation, there also is the creation of debris as the inner shear ring portion 88' and outer ring portion 86' (shown in phantom) are severed and split.

Thus, the advantages of the FIG. 1 construction over that of FIG. 6 can also be seen from the above. In addition, with the construction of FIG. 1, different types of lock rings (as shown in FIGS. 5 and 6) for single action tool applications with different materials need not be used since the annular ring construction of FIG. 1 will suffice in both cases where the FIGS. 5 and 6 construction is used.

FIG. 7 illustrates the critical nature of pin position in the installed blind bolt. Thus, in FIG. 7, components similar to the components in the embodiment of FIGS. 1 and 3A–3D are given the same numeral designation with the addition of the letter postscrip 'd'. Since FIG. 7 is provided to show pin position, the lock ring has been omitted for simplicity.

Thus in the left hand side of FIG. 7, the dimension B1 shows the maximum allowable distance of the remainder of breakneck land 50d above the head 24d of the sleeve 18d. The dimension B2 on the right hand side shows the maximum allowable distance of the breakneck land 50d below the head 24d. Note that excessive protrusion above head 24d could be aerodynamically undesirable even if the strength of the lock is adequate.

FIG. 8 illustrates the critical nature of lock position in the installed blind bolt. Thus, in FIG. 8, components similar to like components in the embodiment of FIGS. 1 and 3A–3D are given the same numeral designation with the addition of the letter postscrip 'e'.

Thus, in the left hand side of FIG. 8, the dimension A1 shows the maximum allowable distance of the lock ring 20e above the head 24e of sleeve 18e. The dimension A2 on the right hand side shows the maximum allowable distance of the lock ring 20e below the head 24e. Again, the excessive protrusion of the lock ring 20e above head 24e could be aerodynamically undesirable even if the strength of the lock is adequate.

In addition, both FIGS. 7 and 8 illustrate the undesirability of a prematurely driven lock. The construction of the present invention by stabilizing the pin position assists in meeting the A1, A2 and B1, B2 criteria.

It is desirable that the fastener 10 have maximum strength. It is also desirable that the material of the pin 16 be of a high strength. With blind bolt constructions, it is common to have pins and sleeves having tensile strengths of around 95KSI and greater. With the fastener 10 the inherent load required to provide the desired bulbed head must be accommodated taking into account the frictional forces resulting from the application of the setting loads on the ring 20.

Thus since the relative force applied between pin 16 and sleeve 18 is applied solely through the lock ring 20, frictional forces will occur between the ring 20 and the pin 16 increasing the application load levels. The magnitude of this frictional load will be related to the magnitude of the angle 'X' of the conical bore portion 28. As the angle 'X' decreases, the capability of the lock collar 10 to resist radially inward movement decreases and the frictional loads on the pin 16 increase. As the angle 'X' increases, the resistance to radially inward movement increases but at the same time the load required to move the material of the lock ring 20 into the lock pocket 68 increases. It has been conventional with fasteners of the type shown in FIGS. 4 through 6 to utilize an angle 'X' of around 38°. While this provided for easy driving of the lock ring in the constructions shown, such an angle would result in excessive frictional forces with the construction of FIG. 1. At the same time, if angle 'X' is too great, the load required to set the lock ring could become excessive resulting in premature pin break (see Curve A of FIG. 2). Thus with the 38° angle 'X', the lock pocket 68 will provide inadequate hold off for lock ring 20 and will result in high frictional forces on the pin 16. With a 90° angle 'X' for lock pocket 68, the lock collar 20 will be held off sufficiently from the pin 16 to maintain the frictional loads low; however, effective setting of the lock into the lock pocket could require loads of a magnitude that could result in premature pin break. At the same time, the large holdoff load would reduce the effectiveness of the lock to assist the shoulders 34, 44 in pin stop. At the same time the countersunk head 24 for the blind cbolt is enlarged because of the structural nature of the fastener, i.e. larger than a conventional blind rivet head; if angle 'X' is too small dishing could occur away from its similarly angulated mating bore surface. This can be avoided by selecting the angle 'X' to be more than around 60°. Thus it is believed that the angle 'X' should be in a range of approximately 70° to 85°. In one form of the invention, an angle 'X' of 80° was found satisfactory. The conical bore portion 28 defines a generally uniformly inclined, straight surface. It is believed that this configuration assists in the driving of the lock ring 20 into the lock pocket.

As noted, the nose portion 62 of tool 57 is dimensioned to fit within the straight counterbore 30. In setting the lock ring 20, the nose portion 62 can extend into straight counterbore 30 to assure that the material of the lock ring 20 will be sufficiently packed into the lock cavity thus enhancing the resultant lock.

It is desirable to form the blind bolt to have maximum strength and in this regard to utilize materials at their maximum hardness. At the same time, it is desirable to be able to use the fasteners over an extended grip range where materials of varying total thickness can be fastened together. The problem, of course, is to assure that bulbing will occur at the rear sheetline of the last workpiece—i.e. workpiece 12. This can be accomplished by providing a hardened sleeve which has a gradient of hardness decreasing in a direction toward the blind or bulb forming side of the workpiece, i.e., the far side of workpiece 12. The desired gradient can be provided by annealing or tempering a narrow annular section about the sleeve 18 in a location between the maximum and minimum grip lines Mx and Mn, respectively. The remainder of the sleeve 18 will be maintained at or around its original high hardness. This permits the use of a sleeve 18 thermally hardened to its maximum allowable hardness with bulbing assured to occur at the desired location. Other means for providing a gradient can be used.

With the present construction, it has been found that the annealing can be utilized with alloy steels such as 4027, 4037 or the like as well as corrosion resistant steels such as A286, monel or the like.

It should also be noted that, with the subject invention, since radial expansion is inhibited, the blind bolt can more readily be used with workpieces which are softer and/or which would be more susceptible to damage from radial expansion.

While a specific form of the invention is shown and described, changes and modifications may be made without departing from the spirit and scope of the invention, as defined by the appended claims.

I claim:

1. In a fastening system including a blind bolt comprising a tubular sleeve, a pin and lock collar adapted to secure a plurality of workpieces together by means of a relative axial force applied between the pin and the sleeve, and a tool adapted to apply the relative axial force between the pin and the sleeve for setting the blind bolt, with the tubular sleeve adapted to be located in aligned openings in the workpieces and forming a bulbed head at the blind side of the workpieces in response to the relative axial force, the improvement comprising said sleeve having a relatively straight sleeve shank terminating at one end in an enlarged sleeve head, said sleeve having a through bore including an enlarged diameter bore portion at its opposite end, an intermediate bore portion of reduced diameter and an enlarged conical bore portion at said enlarged sleeve head, a sleeve stop shoulder defined by the juncture of said enlarged and intermediate bore portions, said conical bore portion terminating at its outer end in an axially straight walled counterbore portion, said pin having a pin shank terminating in an enlarged pin head at one end and being adapted to be assembled with said sleeve with said pin head overengaging said sleeve shank at said opposite end, said pin shank having an enlarged diameter pin shank portion of a diameter to be received within said enlarged diameter bore portion and having an intermediate pin shank portion of reduced diameter to be received within said intermediate bore portion, a pin stop shoulder defined by the juncture of said enlarged and intermediate pin shank portions, an annular lock groove located adjacent to said intermediate pin shank portion, said pin stop shoulder located a preselected distance from said lock groove such that upon engagement with said sleeve stop shoulder said lock groove will be located in radial alignment with said conical bore portion to define a lock pocket, said lock collar being generally annular and located within said straight counterbore portion, said tool having an anvil nose portion engageable with said lock collar and gripping means for gripping a pull portion of said pin shank at the other end of said pin shank, said tool being a single action tool and being actuable to apply the relative axial force between said pin and said sleeve substantially solely through engagement of said nose portion with said lock collar whereby said pin will move axially relative to said sleeve causing said enlarged diameter bore portion to bulb forming a blind head, said tool continuing to apply the relative axial force via said lock collar until said pin stop shoulder engages said sleeve stop shoulder to initially stop further axial pin movement, said enlarged diameter pin shank portion and said intermediate pin shank portion being of diameters generally no larger than the corresponding diameters of said enlarged bore portion and said intermediate bore portion, respectively, whereby substantially no radial expansion of said sleeve shank occurs during axial movement of said pin to the position of engagement of said pin and sleeve stop shoulders, said lock collar being continuously urged into engagement with said pin by the relative axial force as applied by said nose portion and being moved into said lock pocket to support the stop created by said pin and sleeve stop shoulders whereby radial expansion of said intermediate bore portion of said sleeve by said enlarged diameter pin shank portion is inhibited, said conical bore portion having a preselected included, single angle within a range of from around 70° to around 85° whereby excessive friction of said lock collar against said pin is avoided while permitting movement of said lock collar into said lock pocket at a setting load less than a preselected magnitude and at which lock collar provides pin stop assistance to preclude excessive axial pin movement resulting from radial expansion of said sleeve shank via movement of said enlarged diameter pin shank portion past said sleeve stop shoulder and into said intermediate bore portion, said sleeve being adapted to be received in said aligned openings in fits from a preselected interference to a preselected clearance, said clearance being at least 0.006" for a nominal ¼" (0.260") diameter.

2. The blind bolt of claim 1 with the tensile strength of said sleeve and said pin being hardened generally in excess of around 95KSI.

3. The blind bolt of claim 2 with said sleeve being thermally hardened and with said sleeve shank being annealed to provide a gradient of reduced hardness to facilitate formation of the bulbed head adjacent said blind side over a selected grip range of workpieces.

4. In a fastening system including a blind bolt comprising a tubular sleeve, a pin and lock collar and adapted to secure a plurality of workpieces together by means of a relative axial force applied between the pin and the sleeve, and a tool adapted to apply the relative axial force between the pin and the sleeve for setting the blind bolt, with the tubular sleeve adapted to be located in aligned openings in the workpieces and forming a bulbed head at the blind side of the workpieces in response to the relative axial force, the improvement comprising said sleeve having a relatively straight sleeve shank terminating at one end in an enlarged sleeve head, said sleeve having a through bore including an enlarged diameter bore portion at its opposite end, an intermediate bore portion of reduced diameter and an enlarged conical bore portion at said enlarged sleeve head, a sleeve stop shoulder defined by the juncture of said enlarged and intermediate bore portions, said conical bore portion terminating at its outer end in an axially straight walled counterbore portion, said pin having a pin shank terminating in an enlarged pin head at one end and being adapted to be assembled with said sleeve with said pin head overengaging said sleeve shank at said opposite end, said pin shank having an enlarged diameter pin shank portion of a diameter to be received within said enlarged diameter bore portion and having an intermediate pin shank portion of reduced diameter to be received within said intermediate bore portion, a pin stop shoulder defined by the juncture of said enlarged and intermediate pin shank portions, an annular lock groove located adjacent to said intermediate pin shank portion, said pin stop shoulder located a preselected distance from said lock groove such that upon engagement with said sleeve stop shoulder said lock groove will be located in radial alignment with said conical bore portion to define a lock pocket, said lock collar being generally annular and located within said straight counterbore portion, said tool having an anvil nose portion engageable with said lock collar and gripping means for gripping a pull portion of said pin shank at the other end of said pin shank, said tool being a single action tool and being actuable to apply the relative axial force between said pin and said sleeve substantially solely through engagement of said nose portion with said lock collar whereby said pin will move axially relative to said sleeve causing said enlarged diameter bore portion to bulb forming a blind head, said tool continuing to apply the relative axial force via said lock collar until said pin stop shoulder engages said sleeve stop shoulder to initially stop further axial pin movement, said enlarged diameter pin shank portion and said intermediate pin shank portion being of diameters generally no larger than the corresponding diameters of said enlarged bore portion and said intermediate bore portion, respectively, for providing substantially no radial expansion of said sleeve shank, said lock collar being continuously urged into engagement with said pin by the relative axial force as applied by said nose portion and being moved into said lock pocket to support the stop created by said pin and sleeve stop shoulders whereby radial expansion of said intermediate bore portion of said sleeve by said enlarged diameter pin shank portion is inhibited, said conical bore portion having a preselected straight tapered angle of around 80° whereby excessive friction of said lock collar against said pin is avoided while permitting movement of said lock collar into said lock pocket at a setting load less than a preselected magnitude and at which said lock collar provides pin stop assistance to preclude excessive axial pin movement resulting from radial expansion of said sleeve shank via movement of said pin stop shoulder past said sleeve stop shoulder and into said intermediate bore portion, said sleeve being adapted to be received in said aligned openings in fits from a preselected interference to a preselected clearance, said clearance being at least 0.006" for a nominal ¼" (0.260") diameter.

5. The blind bolt of claim 4 with the tensile strength of said sleeve and said pin being hardened generally in excess of around 95KSI.

6. The blind bolt of claim 5 with said sleeve being thermally hardened and with said sleeve shank being annealed to provide a gradient of reduced hardness to facilitate formation of the bulbed head adjacent said blind side over a selected grip range of workpieces.

7. In a fastening system including a blind bolt comprising a tubular sleeve, a pin and lock collar adapted to secure a plurality of workpieces together and a single action tool adapted to apply a relative axial force between the pin and the sleeve solely via the lock collar, with the tubular sleeve adapted to be located in aligned openings in the workpieces and forming a bulbed head at the blind side of the workpieces in response to the relative axial force, the improvement comprising said sleeve having a relatively straight sleeve shank terminating at one end in an enlarged sleeve head, said sleeve having a through bore including an enlarged diameter bore portion at its opposite end, an intermediate bore portion of reduced diameter and an enlarged conical bore portion at said enlarged sleeve head, a sleeve stop shoulder defined by the juncture of said enlarged and intermediate bore portions, said conical bore portion terminating at its outer end in an axially straight walled counterbore portion, said pin having a pin shank terminating in an enlarged pin head at one end and being adapted to be received by said sleeve with said pin head engageable with said sleeve shank at said opposite end, said pin shank having an enlarged diameter pin shank portion of a diameter to be located within said enlarged diameter bore portion and having an intermediate pin shank portion of reduced diameter adapted to be located within said intermediate bore portion, a pin stop shoulder defined by the juncture of said enlarged and intermediate pin shank portions, an annular lock groove located adjacent to said intermediate pin shank portion, a closed breakneck groove located in an annular land adjacent said annular lock groove, said pin stop shoulder located a preselected distance from said lock groove such that upon engagement with said sleeve stop shoulder said lock groove will be located in radial alignment with said conical bore portion to define a lock pocket, said lock collar being generally annularly disposed within said straight counterbore portion, said tool having an anvil nose portion engageable with said lock collar and gripping means for gripping a pull portion of said pin shank at the other end of said pin shank, said tool being actuable to apply a relative axial force between said pin and said sleeve via engagement of said nose portion with said lock collar whereby said pin will move axially relative to said sleeve causing said enlarged diameter bore portion to form an enlarged blind head, said tool continuing to apply said relative axial force via said lock collar until said pin stop shoulder engages said sleeve stop shoulder to initially stop further axial pin movement, said enlarged diameter pin shank portion and said intermediate pin shank portion dimensioned relative to said enlarged and intermediate bore portions, respectively, to provide substantially no radial expansion of said sleeve shank during movement of said pin stop shoulder towards and into engagement with said sleeve stop shoulder, said lock collar continuously urged into engagement with said pin by the relative axial force as applied by said nose portion and being moved into said lock pocket to support the stop created by engagement of said pin and sleeve stop shoulders whereby radial expansion of said intermediate bore portion of said sleeve by said enlarged diameter pin shank portion is inhibited, said conical bore portion having a preselected included angle having a magnitude whereby excessive friction of said lock collar against said pin is avoided while permitting movement of said lock collar into said lock pocket at a lock collar setting load less than a preselected magnitude and at which said lock collar provides pin stop assistance to preclude excessive axial pin movement resulting from radial expansion of said sleeve shank via movement of said enlarged diameter pin shank portion past said sleeve stop shoulder and into said intermediate bore portion, said sleeve being adapted to be received in said aligned openings in fits from a preselected interference to a preselected clearance, said clearance being at least 0.006" for a nominal ¼" (0.260") diameter.

8. The blind bolt of claim 7 with said included angle being in a range of from around 70° to around 85°.

9. The blind bolt of claim 8 with said conical bore portion being a straight tapered surface.

10. The blind bolt of claim 7 with said included angle being around 80°.

11. The blind bolt of claim 8 with said pin and sleeve being constructed of materials hardened to a tensile strength greater than around 95KSI.

12. The blind bolt of claim 7 with said included angle being greater than that at which dishing will occur of said enlarged sleeve head when it is in a countersunk form and adapted to be received in a similarly shaped countersunk portion of said aligned openings.

13. The blind bolt of claim 7 with said included angle being greater than that at which dishing will occur of said enlarged sleeve head.

* * * * *

UNITED STATES PATENT AND TRADEMARK OFFICE
CERTIFICATE OF CORRECTION

PATENT NO. : 4,844,673

DATED : July 4, 1989

INVENTOR(S) : James W. Kendall

It is certified that error appears in the above-identified patent and that said Letters Patent is hereby corrected as shown below:

On the title page:
In the References Cited: delete "4,288,016" and substitute therefor --3,288,016--.
In the Abstract: Line 4, after "in" 2nd occurrence, insert --aligned workpiece--.
In the Abstract: Line 6, after "on" insert --said--.
In the Abstract: Line 7, after "and" delete --said--.
In the Abstract: Line 15, delete "said" second occurrence.
In the Abstract: Line 20, after "to" insert --pin stop--.
Column 3, line 62, delete "interfer" and substitute therefor --interfere--.
Column 7, line 43, delete "20 b" and substiute therefor --20b--.
Column 8, line 43, delete "postscrip" and substitute therefor --postscript--.
Column 8, line 58, delete "postscrip" and substitute therefor --postscript--.
Column 9, line 43, delete "cbolt" and substitute therefor --bolt--.

Signed and Sealed this

Twelfth Day of June, 1990

Attest:

HARRY F. MANBECK, JR.

*Attesting Officer*    *Commissioner of Patents and Trademarks*